United States Patent
Gillespie et al.

[15] 3,650,396

[45] Mar. 21, 1972

[54] REFUSE SEPARATING AND SORTING METHOD AND APPARATUS

[72] Inventors: Robert M. Gillespie; Hugh R. Rhys, both of Grand Rapids, Mich.

[73] Assignee: Sortex Company of North America, Inc., Lowell, Mich.

[22] Filed: Nov. 18, 1970

[21] Appl. No.: 90,663

[52] U.S. Cl. ................................209/3, 209/11, 209/12, 209/75, 209/111.7
[51] Int. Cl. .......................................B07c 5/342
[58] Field of Search ..................209/111.6, 75, 3, 138, 139, 209/213, 214, 111.8, 111.7, 11, 12, 70

[56] References Cited

UNITED STATES PATENTS

| | | | |
|---|---|---|---|
| 2,975,898 | 3/1961 | Nelson | 209/238 |
| 3,011,634 | 12/1961 | Hutter | 209/111.7 UX |
| 3,123,551 | 3/1964 | Walker | 209/29 |
| 3,467,594 | 4/1969 | Musschoot | 209/426 |

*Primary Examiner*—Richard A. Schacher
*Attorney*—John E. McGarry

[57] ABSTRACT

A method and apparatus for sorting refuse into its components for recycle. The refuse, which contains glass, metals, paper, etc., is first comminuted and a fibrous pulp fraction is removed. Magnetic materials are removed by magnetic separation and lighter metals such as aluminum are separated from a glass containing concentrate by entraining the light metal fraction in an upwardly moving air column. A glass containing fraction, which has been sized, washed, and dried, is then sorted according to color to separate one kind of glass, such as flint glass, from other kinds or colors of glass by sensing an optical property of the glass and thereafter mechanically separating the glass particles according to the value of the optical property sensed.

25 Claims, 3 Drawing Figures

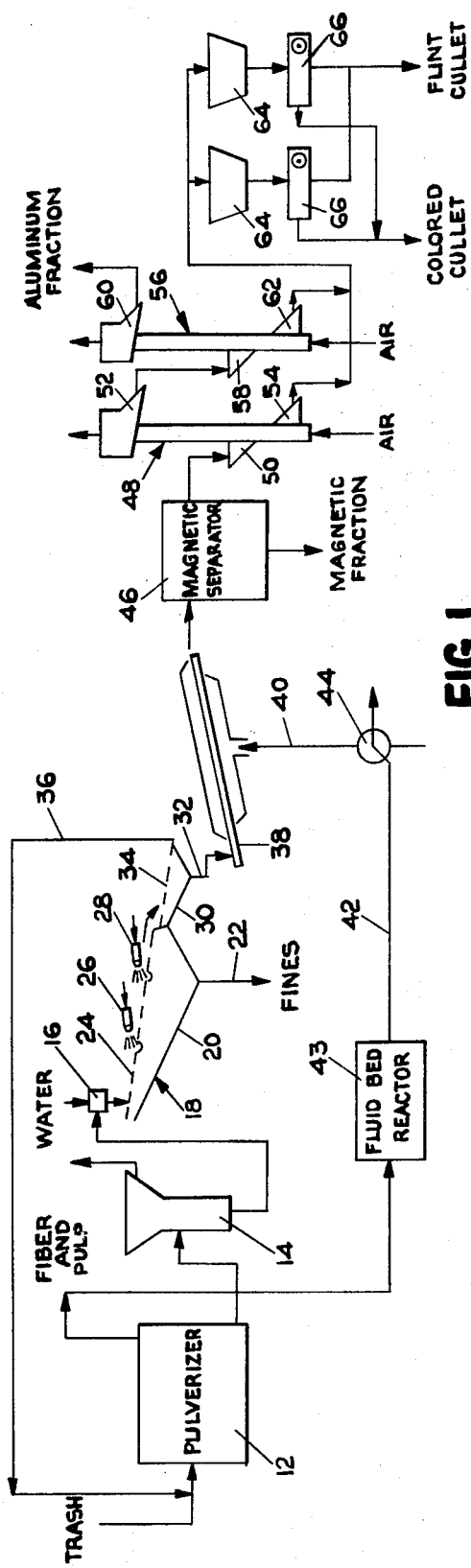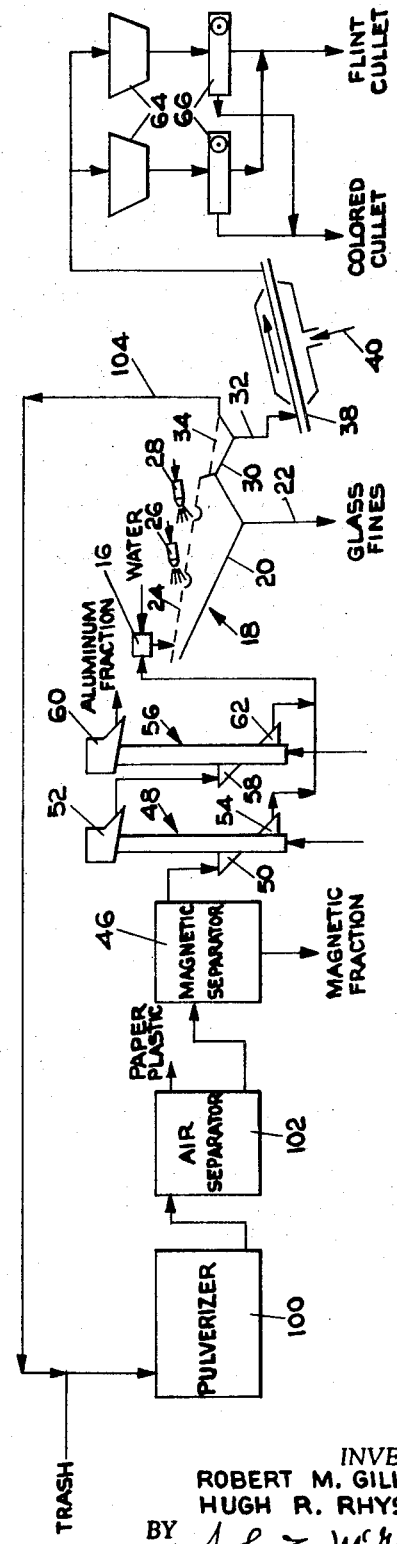

REFUSE SEPARATING AND SORTING METHOD AND APPARATUS

BACKGROUND OF THE INVENTION

1. Field of the Invention

This invention relates to sorting of refuse. In one of its aspects, it relates to sorting of glass particles by photometric means to produce a salable glass cullet.

2. Description of the Prior Art

Solid waste disposal has been recognized more recently as a critical problem of an affluent society. In many cities, land is simply not available for continued dumping of refuse. In many areas, valuable flood plains are being filled in, giving rise to the spector of catastrophic floods in years to come. In other areas, valuable water lands are being filled in with refuse with the result that valuable recreation facilities may be lost to future generations who may live in an overcrowded world. In addition, these filling practices often upset the ecology of an area and such action may ultimately adversely affect our own well-being.

One of the major contributors to the solid waste problem is containers, notably glass and metal. One of the long range problems with the large volumes of disposable containers is the possibility of depleting our natural resources which are used in these containers. Such resources are also used for other important products which are now or may in the future be essential to maintain the health and welfare of our society.

The problems of glass containers have been especially noteworthy of late because of the transition from returnable bottles to nonreturnable bottles. Many governmental units have proposed local ordinances and legislation in order to require the glass manufacturers to return to the deposit bearing returnable bottles. Such procedures tend to make the glass container noncompetitive with nonglass containers.

It has most recently been suggested that these problems can be greatly alleviated by recycling the waste products so that new containers can be made from the old ones. In addition, other by-products can be conceivably developed for use in diverse products. For example, finely ground glass has been found to be a suitable filler for bituminous road compositions.

Currently, colorless or flint glass is valuable to glass manufacturers as feed for melt. Colored glass cullet can also be used as melt for colored bottles such as brown bottles. Heretofore, no suitable methods and apparatus have been developed to economically sort or segregate refuse so that glass in the refuse can be recycled for use in new containers.

The approach to refuse separating has been to shred, pulverize, or comminute the refuse, remove the paper and plastics by burning, flotation, or air separating or tabling techniques, and remove the magnetic metals by a magnetic separator. The resulting fraction is rich in nonmagnetic light metal, glass and some plastics. Some efforts have been made to sort the nonmagnetic metals from the glass and plastics by various liquid and air devices. One such device uses a vibrating foraminous trough conveyor and passes a liquid current therethrough to take away the lighter specific gravity materials. Such an apparatus is disclosed in U.S. Pat. No. 3,467,594. Other efforts have been made to sort glass from lighter metals by entraining the lighter metals in an upwardly moving wavy air column and permitting the glass to settle to the bottom of the column.

OBJECTS

By various aspects of this invention, one or more of the following, or other, objects can be obtained.

It is an object of this invention to provide a method and apparatus to recover a valuable glass fraction from refuse or other such waste feed for recycle use in glass melt.

It is another object of this invention to provide an economical method and apparatus for sorting refuse into glass fractions suitable for glass melts.

It is yet another object of this invention to provide an economical and simple method of separating glass particles according to color.

It is a further object of this invention to provide an economic and simple method of recovering a flint or colorless cullet from domestic trash.

Other aspects, objects, and the several advantages of this invention are apparent to one skilled in the art from a study of this disclosure, the drawings, and the appended claims.

BRIEF SUMMARY OF THE INVENTION

The invention provides a method and apparatus of recovering a glass cullet of a particular color, such as flint glass, from a waste feed, such as domestic trash, for recycle use in a glass melt. The feed is pulverized and a glass fraction is separated from a nonglass fraction. The glass fraction is passed piece by piece through a photometric sensing means which senses an optical property of each particle. Based on the value of the optical property sensed, the particles are systematically sorted, preferably by deflecting the free fall of particles with a given value with a blast of air. The glass particles are washed and sized prior to sorting, particle sizes in the range of one-eighth to three-fourth inch being suitable. After magnetic metals are removed from the particulate feed, the glass is separated from light nonmagnetic metals such as aluminum by entraining the nonmagnetic metals in an upwardly moving gas or air column. The sizing and washing steps can take place before or after the magnetic separating and/or the air entraining steps, depending on the nature of the feed.

BRIEF DESCRIPTION OF THE DRAWINGS

The invention will now be described with reference to the accompanying drawings in which:

FIG. 1 illustrates a first embodiment of the invention;

FIG. 3 illustrates a second embodiment of the invention.

DETAILED DESCRIPTION OF THE PREFERRED EMBODIMENTS

Figure 2:
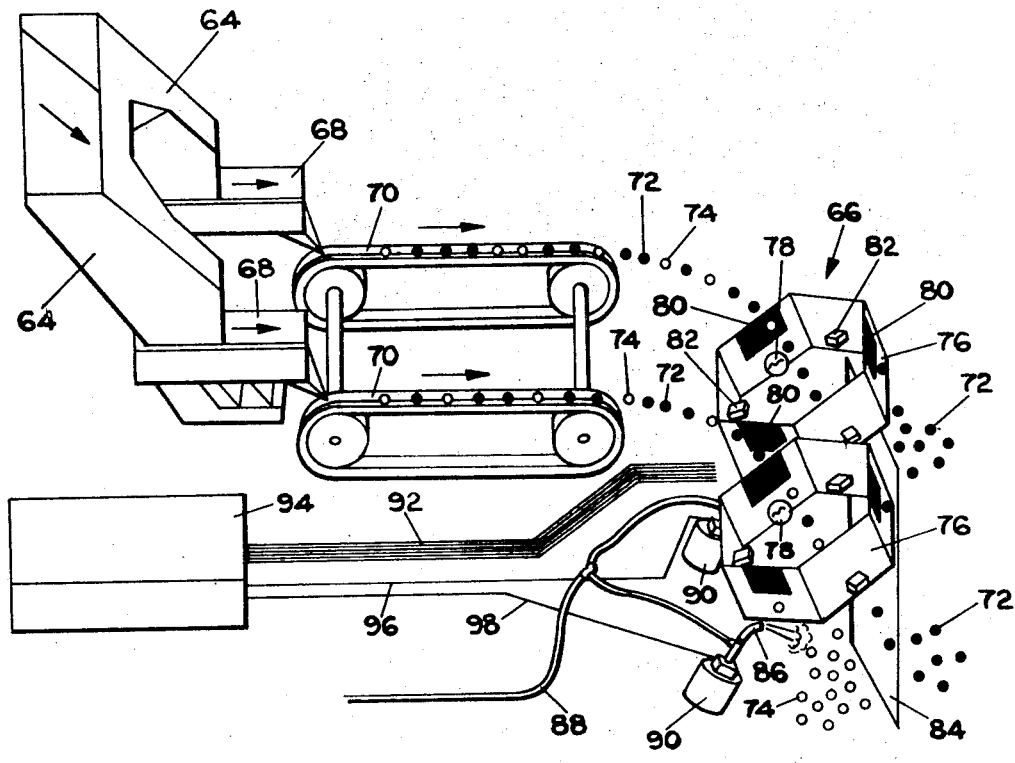
FIG. 2 schematically illustrates a photoelectric sorting apparatus which can be used according to the invention.

Referring now to the drawings, and to FIG. 1 in particular, there is shown a system for sorting glass particles according to color to produce a valuable fraction which can be remelted for bottles and other containers.

Domestic trash or other suitable refuse feed is fed to a pulverizer unit 12 which pulverizes or comminutes the feed producing a pulp fraction and a concentrated solids fraction. A suitable pulverizer is a Black Clawson Hydrapulper manufactured by the Black Clawson Company of Middletown, Ohio. The solids fraction is passed to a cyclone separator 14 which removes a water and fiber fraction from an upper portion and a more concentrated solids fraction from a bottom portion.

The dewatered solids fraction is passed by a suitable conveyor to a washer and distributor 16 where water is added thereto. The watered fraction is distributed onto a screening and washing machine 18 having a hopper 20 with an outlet 22 at the bottom thereof and a screen 24 across the top. The screen 24 has vibratory motion imparted thereto to move the solids fraction along the top of the screen 24 where it is subjected to a further water wash from a pair of nozzles 26 and 28 positioned above the screen. A suitable screen has 1/4 inch openings to permit particles of one-fourth inch or less to pass therethrough into hopper 20. These particles or fines are removed through the outlet 22. Those particles larger than one-fourth inch then move to the lower end of the screening and washing machine 18 onto a second screen 34. Vibratory motion is imparted to this screen also. This screen 34 preferably has openings of three-fourth of an inch to permit particles smaller than three-fourth of an inch to pass therethrough. The larger particles move to the bottom end of screen 34 where they are removed and passed through a recycle line 36 back to the pulverizer 12. The recycle line can be a pneumatic conveyor or any suitable means for returning the oversized particles back to the pulverizer. For example, the oversize particles can even be carted back to the pulverizer in a truck. The particles collected in the hopper 30 will have a size predominately between one-fourth and three-fourth inch. A suitable screening and washing device is manufactured by Derrick Manufacturing Company of Buffalo, New York.

The particles are removed from the bottom of the hopper 30 through an outlet 32 and passed to a fluidized bed conveyor and dryer 38. As the particles are passed through this fluidized bed dryer 38, air is directed upwardly therethrough to remove water therefrom. The air is heated and supplied through a line 40.

The pulp and fibrous fraction from the pulverizer 12 can be passed to a fluid bed reactor 43 after suitable water removal steps (not shown) and incinerated in the reactor 43. Excess heat in the form of hot air, suitably scrubbed clean of noxious elements, may be bled from the fluid bed reactor 43, diluted with cold air if required, and admitted to the dryer either directly or through a heat exchanger 44 through line 42. Alternatively, the dryer may have its own provision for heat generation. Suitable machines are manufactured by the Door Oliver Company of Stamford, Connecticut (reactor), and the Jeffrey Manufacturing Company of Columbus, Ohio (dryer) respectively. The dryer may include a cooling stage if required. Alternatively, the hot gases may be used to convey the material directly through a pneumatic conveyor such as that manufactured by the Meyer Machine Company of San Antonio, Texas.

The dried particles are removed from an upper end of the dryer 38 and passed to a magnetic separator 46. Any suitable magnetic separator can be used. An example of such separator is a Rotating Drum Type Magnetic Separator, manufactured by the Dings Magnetic Company of Milwaukee Wisconsin.

A magnetic fraction is separated from a nonmagnetic fraction in the separator 46. The nonmagnetic fraction is passed to the first of a pneumatic separator 48. The separator 48 has an inlet 50, a light fraction outlet 52, and a heavy fraction outlet 54. Air is supplied to a bottom portion of the separator and passed upwardly therethrough to entrain particles of lighter specific gravity. The particles of lower specific gravity are removed through outlet 52 and passed to the inlet 58 of a second pneumatic separator 56. This separator 56 has an outlet 62 for a heavy fraction and an outlet 60 for a light fraction. Air is passed upwardly through the separator 56 to separate particles of lower specific gravity from particles of higher specific gravity. The lower specific gravity particles are removed through outlet 60. The flow of air through separators 48 and 56 is regulated to entrain those particles whose specific gravity is lighter than glass and to permit glass particles to settle to the bottom of the separator for removal. This lighter fraction contains predominately light weight metals such as aluminum, stones, ceramics, bones, wood, rubber and plastics. This lighter fraction can be passed to an aluminum concentrating apparatus where an aluminum rich fraction can be recovered for reuse. The separation is achieved by regulation of the upward air velocity to split the feed according to the different settling velocities of its particulate components. This differential is a function of particle shape as well as specific gravity. The split can be made in free or hindered settling conditions. A suitable air separator is manufactured by Sortex Company of North America, Inc., Lowell, Michigan.

The heavier fraction from separators 48 and 56 comprises essentially glass.

These heavier glass fractions are combined and passed to a hopper dispenser 64 which dispenses the particles one at a time to a photometric sorting apparatus 66. The glass particles are separated according to color in the photometric sorting apparatus 66 producing a colored cullet fraction and a flint cullet fraction. The flint cullet fraction which is worth considerably more than the colored cullet fraction, can be remelted and used for making clear bottles. The colored cullet fraction can be either further separated by other photometric sensing means (not shown) into different colors, or can be used as a melt for brown bottles.

Reference is now made to FIG. 2 which illustrates in more detail the photometric sorting apparatus shown schematically in FIG. 1.

In this Figure, like numerals have been used to designate like parts. Each of the hopper dispensers 64 is positioned above a feeder tray 68 which assembles the glass particles to be dispensed singularly and seriatim onto a feed belt 70. The particles, thus arranged, are then passed by gravity through the photometric sorting apparatus 66. Each of these apparatus comprises a housing 76, a lamp 78 positioned within the housing 66, and a plurality of photoelectric cells 82 directed inwardly about the inner edge of the housing 66. Desirably, background slides 80 are positioned diametrically opposite each of the photoelectric cells 82. Each photo cell 82 has a lens system directed into the central portion of the housing to sense or detect the reflected light from the glass particles passing through the center of the housing. A splitter plate 84 is positioned directly beneath the housing 76 in such a manner that the particles, if permitted to continue in their trajectory path from the feed belt 70, will fall to the left of the splitter plate. An air ejector device is positioned beneath each of the housings 76 in the path of the glass particles. Each of these devices comprises an air nozzle 86 connected to an air supply hose 88. An air valve 90 controls the flow of air from the nozzle 86. This ejector device is described more fully in U.S. Pat. No. 3 053 497 which is incorporated herein by reference.

Each of the photoelectric cells 82 is electrically connected to a control center 94 through a lead 92. The control center is likewise electrically connected to each of the air valves 90 through electrical leads 96 and 98.

In operation of the photometric sorting apparatus, the glass particles will be fed one at a time through the central portion of each housing 76. In FIG. 2, the dark particles 72 represent the colored glass particles and the light particles 74 represent the flint or clear glass particles. It has been discovered that flint or clear glass particles have different optical characteristics as sensed by the photoelectric cells when passed through the photometric sorting apparatus. This characteristic is believed to result primarily from a lower reflected light from the colored glass particles than from the flint glass particles as they pass in front of the photo cells. Conceivably, the different values of the sensed optical property result at least in part from differences in transmitted light between the clear and dark particles.

As each of the particles passes through the housing 75, light is reflected from each particle and the reflected light is sensed or detected by the photoelectric cells 82. A signal representative of the value of the optical property sensed by the photoelectric cells 82 is transmitted to the control center 94. If the value is below a predetermined standard, the control center will send a signal to the air valve 90 which opens to permit air to pass out of the nozzle 86 in the path of the falling particle. The stream of air deflects the particle so that it falls on the right hand side of the splitter plate 84. In this manner, the colored glass particles are ejected to the right side of the splitter plate 84 and the clear or flint particles are permitted to fall naturally to the left side of the splitter plate.

A suitable sorting apparatus is the Sortex 621MD machine sold by the Sortex Company of North America, Inc., Lowell, Michigan.

Reference is now made to FIG. 3 which illustrates a second embodiment of the invention. In this figure like numerals have been used to designate like parts.

Referring now specifically to FIG. 3, trash is fed to a pulverizer 100 which can be of the dry pulverizer type sold by the Jeffrey Company, Columbus Ohio. The trash is therein broken down into small particles which are fed to a separator 102, such as the air table manufactured by Triple S Dynamics, Dallas, Texas, wherein paper, plastic and similar materials are removed from the resulting solids. The heavier particles, including glass and metals, are removed from the separator 102 and passed to a magnetic separator 46 of the same kind referred to in FIG. 1. A magnetic fraction is separated from a nonmagnetic fraction in this magnetic separator 46. The nonmagnetic fraction is passed to the inlet 50 of the first pneumatic separator 48 wherein particles of lower specific gravity are separated from heavier particles of higher specific gravity.

The lower specific gravity fraction is removed from the outlet 60 and it contains a high percentage of aluminum which can be subsequently recovered. The higher specific gravity fraction from the separator 48 is removed from outlet 54 and combined with the higher specific gravity fraction from the separator 56, such fraction being removed from outlet 62. The combined fractions are passed to a washer and distributor 106 wherein water is added to the solids fraction. The watered fraction is then distributed onto a screening and washing machine 18 wherein the fine particles pass through screen 24 and are removed from the bottom of hopper 20 through outlet 22. This glass fines fraction is much richer in glass than the fraction removed in the embodiment of FIG. 1. The larger particles are washed on the screen 24 by the action of water dispensed from nozzles 26 and 28. The particles pass to a second screen 34 of larger size than the screen 24 for further separation according to size. The oversized particles are removed from the top of the screen 34 and recycled through a recycle line 104 back to pulverizer 100.

The suitably sized particles are passed to a fluidized bed conveyor dryer 38 wherein they are dried by the action of hot air introduced through line 40. The dried particles are then passed to hopper dispensers 64 which dispense the particles one at a time through the two photoelectric sorting apparatus 66.

The glass fines removed from outlet 22 of the screening and washing machine 18 are especially suitable for use as an inert aggregate in bituminous compositions for road construction.

In carrying out the process set forth above, it is desirable to have the glass particles in the range of one-fourth to three-fourth inch, and preferably in the range of three-eighths to five-eighths inch. With the particles in the preferred range, flint glass throughputs of over 1,000 pounds per hour have been achieved at a satisfactory sorting efficiency.

SPECIFIC EXAMPLE

Tests were carried out on the system illustrated in FIG. 1 beginning with the washer and distributor 16. Approximately 4,000 pounds per hour of dewatered solids containing aluminum, glass, ferrous metal, stones and ceramics, bones, wood, rubber, plastics, and other miscellaneous items were fed to the washer and distributor 16. Approximately 50 gallons per minute of water was added to the mixer 15 to wash and distribute the solids along the screen 24. Approximately 50 gallons per minute of water at approximately 35 p.s.i. were added through the nozzles 26 in order to further wash the particles as they pass down the screen. The screening and washing device was a forced vibration screen and wash device manufactured by the Derrick Manufacturing Company of Buffalo, New York. The wet solids removed from the bottom of the hopper 30 were dried under infrared red lamps. The dried particles were then magnetically separated to remove magnetic materials therefrom. The nonmagnetic materials were passed through two sets of Sortex air separators with the light fraction removed from the top of the first set of separators being passed to the feed to the second set of separators. The heavy fractions removed from the bottom of each of these separators were combined and passed to a Sortex 621MD Optical Separator wherein flint or colorless glass was optically separated from colored glass. Approximately 2,000 pounds per hour was processed by the optical separators with the flint or colorless glass being approximately 1,000 pounds per hour. Upon analysis of the flint concentrate, it was found that better than 90 percent of the concentrate was pure flint glass. About 20 percent of flint glass was contained in the colored cullet concentrate.

Whereas the invention has been described with reference to the ultimate sorting of flint or colorless cullet from colored cullet, it is within the scope of the invention to separate glass of any one color from glass from another color. At this time, the flint cullet has greater value than the colored cullet so that this separation is most desirable. However, as mentioned above, the colored cullet can be further separated into its component colors by use of suitable filters in photometric sensing devices of the same nature described above.

The photometric sorting apparatus described above rely primarily on light reflected from the glass particles as they pass in front of photo cells. However, it is within the scope of the invention to employ different types of photometric sorting machines which rely on transmitted light or a combination of transmitted and reflected light.

The invention has been described with reference to a complete system starting with domestic refuse or other suitable feed and finishing with glass particles separated according to color. Conceivably the initial steps of the process might be carried out at locations remote from the later steps. For example, the refuse could be pulverized and the solids fraction dewatered at one location and the dewatered solids could be trucked to another location for glass separation. The location of the steps will depend on the economics of transportation.

As used throughout this specification and claims, color is intended to include colorless or flint glass as well as pigmented glass.

Reasonable variation and modification are possible within the scope of the foregoing disclosure, drawings and the appended claims without departing from the spirit of the invention.

The embodiments of the invention in which an exclusive property or privilege is claimed are defined as follows:

1. In a method of sorting refuse into its components wherein said refuse is comminuted into a particulate mass, and a glass fraction consisting of substantially only glass is separated from a nonglass fraction, the improvement which comprises:
   feeding glass particles in said glass fraction seriatim through a sensing zone;
   photoelectrically sensing an optical property of each of said glass particles as it passes through said sensing zone; and
   separating glass particles of a given value of said optical property from those of other values of said optical property.

2. A method of sorting refuse according to claim 1 wherein each of said glass particles freely falls through said sensing zone toward a first collecting zone and particles of said other values are deflected toward a second collecting zone responsive to the value of the optical properties sensed in said sensing zone, whereby said particles of said other values are received in said second collecting zone and the nondeflected particles are received in said first collecting zone.

3. A method of sorting refuse according to claim 1 wherein said separating step comprises passing a glass-nonglass aggregate through a separating zone, passing a column of gas upwardly within said separating zone to entrain lighter nonglass particles within said upwardly moving gas column, leaving a glass rich concentrate consisting of substantially only glass, and recovering the glass rich concentrate.

4. A method of sorting refuse according to claim 3 wherein said separating step further comprises a magnetic separation step wherein magnetic particles are separated from nonmagnetic particles.

5. A method of separating refuse according to claim 3 and further comprising the step of separating glass particles within a given size range from other size glass particles prior to said sensing step.

6. A method of separating refuse according to claim 5 wherein said size range of said particles is one-fourth to three-fourth inch.

7. A method of separating refuse according to claim 5 wherein said size range of said particles is three-eighths to five-eighths of an inch.

8. A method of separating refuse according to claim 1 and further comprising the step of separating glass particles within a given size range from other size glass particles prior to said sensing step.

9. A method of separating refuse according to claim 8 wherein said glass particles are washed prior to said sensing step.

10. A method of separating refuse according to claim 1 wherein said glass particles are washed prior to said sensing step.

11. A method of separating refuse according to claim 1 wherein said optical property is at least one of the reflectivity and the transmittance of light and said glass particles are separated according to color.

12. A method of separating refuse according to claim 1 wherein said optical property is the reflectivity of light and said glass particles are separated according to color.

13. A method of separating a glass containing particulate feed according to color, said particulate feed consisting essentially of glass particles, said method comprising the steps of separating glass particles in a given size range from other size glass particles; passing said glass particles within said size range seriatim through a photometric sensing zone; detecting an optical property representative of the color of each of said particles passing through said photometric sensing zone; and separating particles of one value of said optical property from particles of other values of said optical property in accordance with the value of said optical property detected to thereby separate said particles according to color.

14. A method for separating a glass containing particulate feed according to claim 13 wherein said glass particles within said given size range are washed prior to said detecting step.

15. A method for separating a glass containing particulate feed according to claim 14 wherein said size separating step and said washing step are carried out simultaneously.

16. In a system for sorting refuse into its components, said system having means to comminute said refuse into a particulate mass, and means to separate a fraction consisting of substantially only glass from a nonglass fraction, the improvement which comprises:
means to separate said substantially only glass fraction into a fraction within a given range of particulate sizes and a fraction of said particles larger and smaller than said range;
means for detecting an optical property of glass particles passing through said detecting means;
means for separating glass particles passing through said detecting means according to the value of said optical property detected by said detecting means; and
means to pass said glass fraction of said given range particle size through said detecting means, whereby said glass particles are separated according to the value of said optical property.

17. A system for sorting refuse according to claim 16 and further comprising means to wash said glass particles of said given range particle size upstream of said detecting means.

18. A system for sorting refuse according to claim 17 and further comprising means to dry said glass particles after said washing step and prior to introducing said glass particles into said detecting means.

19. A system for sorting refuse according to claim 17 and further comprising means to separate a glass fraction from a lower specific gravity nonglass fraction, said separation means having means to pass a column of air through a particulate mass to entrain therein particles of a lighter than glass specific gravity, means to remove a lighter than glass specific gravity fraction from an upper portion of said separation means, means to remove a concentrated glass containing fraction from a lower portion of said separation means, and means for passing said glass rich fraction to said detecting means.

20. A system for sorting refuse according to claim 16 and further comprising a means to separate a glass fraction from a lower specific gravity nonglass fraction, said separation means having means to pass a column of gas through a particulate mass to entrain therein particles of a lighter than glass specific gravity, means to remove a lighter than glass specific gravity fraction from an upper portion of said separation means, means to remove a concentrated glass fraction from a lower portion of said separation means, and means for passing said glass rich fraction to said detecting means.

21. A system for sorting refuse according to claim 16 wherein said optical property is reflected light and said detecting means senses the reflected light from said glass particles.

22. In a system for separating refuse into its components, said system having means to comminute said refuse into a particulate mass, and means to separate a fraction consisting of substantially only glass from a nonglass fraction, the improvement which comprises:
means to wash said substantially only glass fraction;
means for detecting said optical property of said glass particles passing through said detecting means;
means for separating glass particles according to the value of said optical property detected by said detecting means; and
means to pass said washed glass fraction through said detecting means, whereby said glass particles of one optical property value are separated from glass particles of other optical property values.

23. A system for sorting refuse according to claim 22 and further comprising means to dry said washed glass fraction upstream of said detecting means.

24. A system for sorting refuse according to claim 22 and further comprising means to separate a glass fraction from a nonglass fraction of a lower specific gravity, said separation means having means to pass a column of air through said particulate mass to entrain therein particles of a lower specific gravity than glass; means to remove a lower specific gravity nonglass fraction from an upper portion of said separation means; means to remove said substantially only glass fraction from a lower portion of said separation means; and means for passing said glass fraction to said detecting means.

25. A system for sorting refuse according to claim 22 wherein said optical property is reflected light, and said detecting means detects the reflected light of said particles as they pass through said detecting means.

* * * * *